United States Patent [19]
Martin et al.

[11] Patent Number: 4,783,519
[45] Date of Patent: Nov. 8, 1988

[54] HIGH FUNCTIONALITY, LOW MELT VISCOSITY, FLAKABLE SOLID EPOXY RESIN WITH GOOD HEAT RESISTANCE

[75] Inventors: Patrick H. Martin, Danville; Theodore L. Parker, Lafayette; Paul G. Schrader, Antioch, all of Calif.

[73] Assignee: The Dow Chemical Company, Midland, Mich.

[21] Appl. No.: 146,899

[22] Filed: Jan. 22, 1988

Related U.S. Application Data

[63] Continuation of Ser. No. 663,295, Oct. 22, 1984.

[51] Int. Cl.$^4$ ..................... C08G 59/02; C08G 59/32
[52] U.S. Cl. .......................................... 528/98; 528/89
[58] Field of Search ..................................... 528/98, 89

[56] References Cited

U.S. PATENT DOCUMENTS

| | | | |
|---|---|---|---|
| 2,694,694 | 11/1954 | Greenlee | 260/47 |
| 3,146,254 | 8/1964 | Boozalis et al. | 260/461 |
| 4,394,496 | 7/1983 | Schrader | 528/98 |
| 4,440,914 | 4/1984 | Helfand | 525/482 |
| 4,465,722 | 8/1984 | Fiaux et al. | 528/88 |

FOREIGN PATENT DOCUMENTS

131647  2/1984  Japan.

Primary Examiner—Earl Nielsen
Attorney, Agent, or Firm—Robert R. Stringham

[57] ABSTRACT

Liquid epoxy resins can be converted to non-sintering, relatively low equivalent weight, flakable solid opoxides having relatively low melt viscosities by advancing the resins with 1,1,1-tri(hydroxyphenyl)alkanes or -alkenes in which the alkane or alkene moiety contains from 1 to 11 carbons.

9 Claims, No Drawings

HIGH FUNCTIONALITY, LOW MELT VISCOSITY, FLAKABLE SOLID EPOXY RESIN WITH GOOD HEAT RESISTANCE

CROSS-REFERENCE TO RELATED APPLICATION

This is a continuation of application Ser. No. 663,295, filed Oct. 22, 1984.

BACKGROUND OF THE INVENTION

The use of epoxy resins as casting resins and molding compounds is well known. In such application, the resins desirably have certain of the properties generally shown by higher molecular weight resins, i.e., are non-sintering, flakable solids, but also have the lower equivalent weights and low melt viscosities characteristic of lower molecular weight resins. It will be appreciated that resins having such a combination of properties are not easily come by; a compromise is generally made.

Conventional expedients include adducting novolacs per se with the diglycidylether of bisphenol A (DGEBA) and the use of ring-substituted epoxy novolacs, such as—for example—"epoxidized" cresol novolacs. The novolac components of such adducts or substituted epoxides consist predominantly of linear, oligomeric molecules having an average of from about 3 to 6 phenolic hydroxyls—as such or as glycidyl ethers thereof.

DGEBA, a low molecular weight diepoxide, is conventionally "advanced" to a higher molecular weight through adduction of oxirane groups with phenolic hydroxyls in novolacs or bisphenols (Bisphenol-A or "bis A", predominantly), thereby producing polyether polyhydroxy epoxides. The adduction conventionally is carried out in the presence of a catalyst or initiator constituting about 0.1 wt.% of the reaction mixture. Typically, the epoxide to bisphenol weight ratio is about 3:1 and the phr of the phenol (parts bisphenol per hundred parts of the "resin" or epoxide) is about $100/3 \times 1 = 33.3$. The reactants and catalyst are heated rapidly to onset of an exotherm, at about 150° C. The exotherm is allowed to drive the temperature to a peak value of about 180°–200° C. and then to subside until the temperature reaches about 160° C. This temperature is maintained for about 3 hours and the product is poured into trays and allowed to cool and solidify or is "flaked" (cooled and solidified in the form of chips or flakes).

The resulting advancement products are generally prone to sinter if they have softening points of about 60° C. or less.

Not all conventional molding or casting epoxies are solids and, of those which are, not all are flakable and/or non-sintering. That is, the inconveniences involved in using resins which can't be flaked and which "sinter" or "block" (lose particulate form by fusing under their own weight at ordinary temperatures) are accepted as a trade-off against the higher costs and/or poorer heat resistances (when cured) of more easily worked-with resins. Another trade-off against cost is slower gellation. That is, the lower functionality resins, although slower gelling, are also less expensive and may be acceptable on this account in some specific applications.

Thus, the ordinary, unsubstituted novolac epoxides have acceptably lower melt viscosities and relatively high functionalities and glass transition temperatures (Tg's) but cannot be utilized simply as crude reaction mixtures which have not been worked up (working up costs money). They also sinter, by reason of unavoidably including excessive proportions of low molecular weight species. The solid epoxies obtained by advancement of DGEBA with bisphenol A can be used simply as fusion mixtures but will have high melt viscosities, low Tg's and lower functionalities when of sufficient average molecular weight to be non-sintering. The substituted novolac expoxides have high Tg's, do not include excessive proportions of low molecular weight species and have relatively high functionalities. However, they cannot be used as reaction mixtures which have not been worked up (to remove solvent, by-products; etc.) and have somewhat high melt viscosities.

A recently developed type of epoxy "novolac" is the oligomeric, high functionality epoxides disclosed in U.S. Pat. No. 4,394,496, as being formed by the adduction of 1,1,1-tri(hydroxyphenyl)alkanes with the corresponding triglycidyl ethers thereof. These epoxides have high Tg's and are flakable and non-sintering but also have high melt viscosities, are non-linear and would appear to be useful in epoxy casting or molding resin systems only in admixture with other types of epoxies.

The monomeric triepoxides also disclosed in the patent include some (the triepoxide of leucaurin, most notably) which are liquids of low equivalent weight and—when cured—have high heat distortion temperatures. However, they are also highly viscous.

OBJECTS OF THE INVENTION

The primary object of the present invention is to provide an epoxy resin having utility as a relatively inexpensive, solid molding or casting material which has a low melt viscosity, a high functionality and an adequately high Tg, is both non-sintering and flakable and can be prepared as a fusion mixture which does not require working-up to be ready for use.

A further object is to provide such a resin which is derivable by the reaction of known kinds of epoxy resins with polyphenols readily obtainable as or from by-products of salicyclaldehyde manufacture.

An additional object is to provide as such a resin one in which the poly-phenol need be present only in such minor amounts that the epoxide/phenol reaction mixture does not prematurely gel at the temperature required for an adequately low melt viscosity.

Another object is to provide an epoxy molding or casting resin which is preparable from reactants which can be employed in such low proportions that the resin, although a solid, has a relatively low EEW.

An additional object is to provide solid epoxy resins having lower epoxide equivalent weights than those conventionally employed as molding compounds.

A further object is to provide a solid epoxy molding or casting resin which can be flaked at lower temperatures and is therefore more stable to processing.

It is also an object to provide an improved advancement process which makes practicable the use of 1,1,1-tri(hydroxyphenol)-alkanes or -alkenes, as the phenolic reactant, on a commercial scale.

Still other objects will be made apparent to those knowledgeable in the art by the following specifications and claims.

SUMMARY OF THE INVENTION

It has been found that the foregoing objects can be achieved by means of:

I. An epoxide having an average oxirane functionality of about 2 or more and comprising at least 5 weight percent of oligomeric molecules which are each derivable from adductive reaction of a diepoxide having an EEW of about 300 or less (preferably 170–190) with a 1,1,1-tri(hydroxyphenyl)-alkane or alkene wherein the alkene moiety contains from 1 to 11 carbons, the mole ratio of said diepoxide to said triphenol, in each of said molecules, being, independently, within the range of from 2:1 to 3:1;

II. Preparing said adduction-derivable molecules by heating from about 10 to about 30 parts by weight of the triphenol with one hundred parts of the diepoxide until a melt results, initiating stirring mixture, sans any free diepoxide or triphenol species, i.e., may consist essentially of one or more [monomeric or] oligomeric adduction products derived from the diepoxide and triphenol. In another option, the epoxide (I) may comprise not only such adducts (in amounts of at least 5 weight percent)—with or without free starting epoxide—but may also include other epoxides, phenolics or adducts of epoxides with monophenols and/or other polyphenols.

Desirably, the epoxide I consists of the mixture obtained by reacting a difunctional liquid epoxy resin with from about 10 to about 30 phr of the triphenol and advantageously 16–28 phr thereof. Preferred is the mixture obtained when the diepoxide is DGEBA (as such or partially hydrolyzed) and from about 18 to about 28 phr of the triphenol is provided. More preferred are mixtures of the latter type in which the triphenol is a 1,1,1-tri(hydroxyphenyl)methane. Particularly preferred are such mixtures in which from about 18 to 22 parts of 1,1,1-tris(p-hydroxyphenyl)methane is employed as the triphenol component.

Either or both of the diepoxide and triphenol reactants may include one or more non-interfering substituents, i.e., substituents which do not adversely effect the adduction reaction or the product thereof to an intolerable degree.

The present composition invention embraces both the cured and uncured forms of the epoxide (I). By the term "cured" is meant converted, by whatever means, to a sufficiently rigid and insoluble solid to have utility for some specific purpose.

DETAILED DESCRIPTION

Suitable "diepoxides" for the preparation of the specified adduction-derivable molecules comprised in the epoxide composition (I) are polyepoxides having average functionalities of from about 1.8 to about 2.2 and EEW's of up to about 300.

Exemplary types of such epoxides are diolefin diepoxides, vinylcycloalkene dioxides, dicyclodiolefin dioxides, divnylbenzene dioxide, diallylbenzene dioxide, the dioxide of biscyclopentenyl ether; the dioxide of p,p'-divinyldiphenyl, the dioxides of divinyl diphenylsulfide and -oxide; diglycidyl ether, the diglycidyl ethers or dihydroxy benzenes and dinuclear diphenols ("bisphenols", most notably) and the diglycidyl esters of diacids.

Other representative epoxides are hydantoin epoxides, such as, for example, N,N'-diglycidyl hydantoins, 1-glycidyl-3-(2,3-diglycidyloxy-prop-1-yl)-5,5-dimethylhydantoin and 1,3-di-(1-glycidyl-5,5-dimethylhydantoin-1-yl)-2-glycidyloxypropane (the latter, nominally trifunctional, epoxides being employed in admixture with one or more epoxides of lower functionality, such that the average functionality of the epoxide reactant is about 2.2 or less). Dihydrouracils, barbituric acids, cyanuric and isocyanuric acids comprising 2 or 3 glycidyl groups are also suitable.

Any of the foregoing epoxides of course may include such non-interfering substituents as it is synthetically feasible to incorporate in them (without unduly increasing their EEW's).

More exotic types of low molecular weight diepoxides, such as those containing silicon, phosphorous or other hetero atoms in linear, branched or cyclic segments of the molecule may also be suitable for preparation of the predominant component of the epoxide (I), either as the sole diepoxide employed in the adduction or in admixture with other dioxides.

The preferred diepoxides are liquid epoxy resins which consist at least predominantly of molecules, of the formula

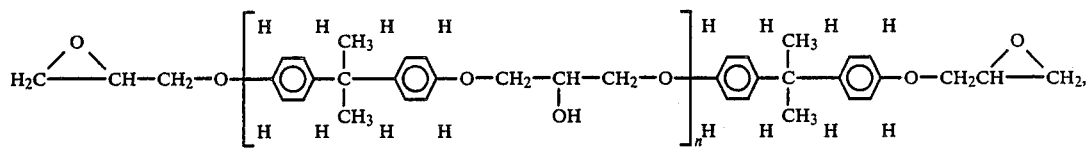

wherein the average value of n is within the range of from 0 to about 0.15 and may include minor proportions of molecules derivable, by oxirane hydrolysis, from molecules of the latter formula.

For ordinary commercial practice, nominal diepoxides formed by partial hydrolysis of a resin consisting of molecules of the latter formula and having an average n value of about 0.15 are most preferred.

Suitable triphenol reactants for the preparation, by adduction, of the essential component of (I) are those of the following formula:

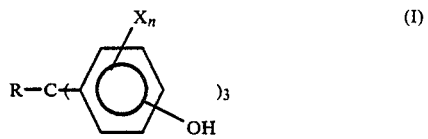

wherein R is H or a branched or linear, $C_1$–$C_{10}$ alkyl or alkenyl radical, n is 0, 1 or 2; X is any non-interfering substituent, the same or different in each occurrence and the position of the —OH on the ring may be the same or different in each occurrence. Desirably, n is zero, R is an alkyl group of less than 5 carbons and the —OH group is in the same position in at least two of the three rings. Preferably, R is H. The most preferred triphenol is that in which R is H, n is zero and each —OH is in the para position, i.e., is the trisphenol, leucaurin.

The triphenols of formula (I) may be made by the methods described in the above-referenced '496 patent.

Another source of tri-(hydroxyphenyl)methanes is the crude reaction mixture produced in the manufacture of salicyclaldehyde by the Reimer-Tiemann (R-T) reaction of chloroform with excess phenol in the presence of NaOH. The R-T reaction mixture is neutralized with HCl, thereby causing separation of an organic phase known as "acid oil" from which the salicyclaldehyde, any unconverted CHCl$_3$ and most of the phenol can be removed by steam stripping. The residual "para tar" contains the triphenols, some phenol and a substantial amount of para hydroxybenzaldehyde—which can be removed by extraction with hot water. The raffinate, or "waste bottoms", contains the monomeric triphenols and can be utilized in the present invention for epoxide advancement. Alternatively, the para tar may be employed as a lower concentration triphenol reactant. Also present in the acid oil, para tar and waste bottoms are substantial amounts of oligomeric polyphenols of the type disclosed in U.S. Pat. No. 4,390,664.

The polyphenol from which at least 5 weight percent of the epoxide composition (I) is adduction-derivable (derived, preferably) is a 1,1,1-tri(hydroxyphenyl)alkane or alkene as above defined. However, (I) may include adduction products of other polyphenols with the same diepoxide(s) or with other epoxides (not necessarily difunctional, so long as the average oxirane functionality of (I) is about 2). Preferred among such other polyphenols are bisphenols; bisphenol-A, most notably. Such other adducts may be coformed with the predominant component—as by reacting a mixture of bis-A and the triphenol with DGEBA, for example, or may be separately prepared and blended with the essential adduction-derivable (and any other) components. As a general rule, however, the advantages of the present invention will be realized to a greater extent when the weight ratio of the triphenol to the other polyphenols comprised in the composition (I) is at least 2:3; desirably the ratio is at least 1 to 1, preferably at least 10 to 1 and most preferably infinite.

Illustrative of higher functionality phenols which may be present (as adducts with epoxides) in (I), at least in minor amounts, are branched, 3 to 7 functional, polynuclear polyphenols—such as those disclosed in U.S. Pat. Nos. 2,801,989 and 4,390,664 and consisting of oligomeric, acid-catalyzed condensation products of monohydroxybenzenes with acrolein or monohydroxybenzaldehydes, respectively.

The adduction reaction may be carried out on a laboratory scale in generally the same manner in which DGEBA is conventionally advanced with bis-A, except that the epoxide/polyphenol mixture—regardless of addition sequence—is not stirred until both reactants are molten; otherwise, very troublesome agglomeration results. However, the latter adaptation does not suffice to make the process practicable with the present triphenols on a commercial scale. The higher functionality of the triphenol generally tends to cause a relatively greater increase in the viscosity of the reaction mixture during the post-exotherm period. This is particularly the case when the product is held several hours as a melt for flaking; the last-flaked portion of the melt becomes very viscous.

It has been found that holding the amount of the advancement catalyst employed to 0.1 phr or less and forced post-exotherm cooling, at least to flaking temperatures, not only greatly reduces the upward viscosity drift but also permits inclusion of substantially more of the triphenol (28 phr, maximum, versus 24 phr of leucaurin, for example) in the product.

In terms of manipulative steps, either version of the process is uncomplicated. The diepoxide(s) and polyphenol(s) are charged to the reactor, preferably as particulate solids but optionally as preformed, separate melts. Once both reactants are in contact with each other in a molten state, stirring is initiated, the catalyst (ethyl triphenyl phosphonium acetate or "A-1 catalyst", for example) is added and heating continued at least until the melt reaches (or will reach by "coasting" to) the temperature at which the exotherm starts. Preferably, heating is continued until the peak temperature reached is high enough to ensure essentially complete dissolution (and conversion) of all of the triphenol reactant. This will generally require more heat than is evolved in the exotherm, when the triphenol is leucaurin and/or when minimal amounts of catalyst are employed. That is, the exotherm preferably is "forced" to a higher peak temperature than would be spontaneously attained.

The reaction mass is cooled, if necessary, to limit the peak temperature to a preselected value of from about 180°–220° C., preferably 185°–200° C. Thereafter, cooling is so regulated that the time period required to reach a temperature (150° C., for example) suitable for holding and flaking is of a preselected, relatively brief duration (about ½ hour or less, in general). Thereafter, the product (the reaction mixture) may be flaked or otherwise processed as a melt, dissolved in a vehicle appropriate to a contemplated use or allowed to solidify.

It is of course possible to carry out the adduction in a medium consisting of one or more solvents. Heating will generally be necessary to effect dissolution of the reactants in a satisfactorily brief time period and, again, it may be necessary to delay agitation until at least one of the reactants is molten (unless the reactants are dissolved separately). Suitable solvents for this purpose are those which are conventionally employed for preparation of high molecular weight DGEBA/Bis-A advancement products. Unless the resulting reaction mixture can be utilized per se, without removing the solvent(s) from it, this option is more costly and less preferred.

In any case, the peak exotherm temperature desirably is allowed to reach a value (200° C., for example) at which the catalyst (A-1, for example) rapidly decomposes. This of course requires, when solvents are employed, the use of high-boiling solvents or operation at super-atmospheric pressures.

The relative amounts of the diepoxide and the triphenol charged to the adduction reaction are such that at least four oxiranes are provided for each phenolic hydroxyl present in the charged triphenol.

Ordinarily, the oxirane to phenolic —OH ratio will be at least as high as that corresponding to a contemplated minimum triphenol content of about 10 phr. If it is desired to maximize the content of lower molecular weight adducts in the product, even higher epoxide to triphenol ratios will be required.

The following considerations show that the average number of diepoxide molecules per triphenol molecule in the adduct molecules necessarily will be within the range of from about 2:1 to 3:1. That is, in the simplest such adduct having only two oxiranes, the mole ratio of the diepoxide to the triphenol is 2:1. This adduct may be represented as

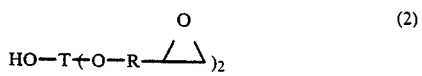 (2)

wherein T represents the triphenol nucleus and

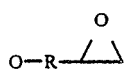

represents a moiety

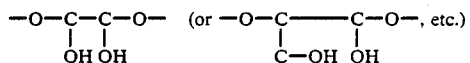

formed by adduction of phenolic hydroxyls with each of the oxirane groups in a diepoxide molecule, and at least a few of the adducts should have structures such as the following, in which all of the phenolic hydroxyls have been reacted out:

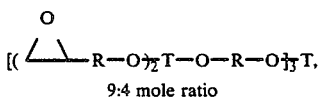  (6)

9:4 mole ratio

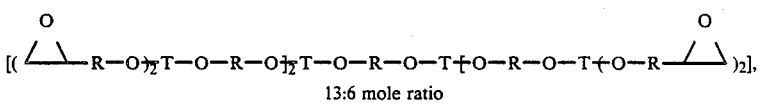  (7)

13:6 mole ratio

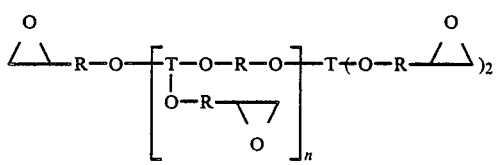  (8)

mole ratio epoxide to triphenol $=(2n+3)/(n+1)$, and

  (9)

3:1 mole ratio

It will be apparent that adducts of the specified type in which the mole ratio of diepoxide to triphenol exceeds 3:1 cannot exit.

Again, in order to prepare an epoxide (I) in which essentially all of the adduct molecules were of the structure (9), by the method of the present invention, one would have to employ a large excess of the diepoxide and "strain out" a fraction of the reaction mixture wherein the adduct molecules would constitute the predominant component. This is particularly so in view of the relatively low mobility and the steric hindrance which should be characteristic of the oligomeric products in which most of the phenolic hydroxyls have been reacted out.

It is to be noted that although the molecules required to constitute the essential component of the epoxide composition (I) must be derivable from adduction of a diepoxide with a triphenol, they may in fact have been produced in other ways. For example, the reaction product of leucaurin with an excess of p-glycidyloxy, p'-allyloxy bisphenol A, followed by oxidation of the double bonds should yield an adduct of the foregoing structure (8). Similarly, oxidation of adducts of the triphenols of formula (1) with diolefin monoxides should yield products meeting the foregoing specifications for the predominant component of the epoxide composition (I) of the present invention. Other types of synthetic routes to the specified predominant components may also be feasible.

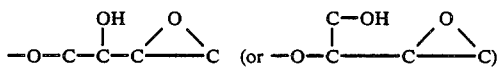

formed by adduction of a phenolic hydroxyl with one of the two oxiranes in a diepoxide molecule.

(Of course, in order to obtain a product by the method of the present invention in which a high proportion of the adduct molecules had structure (2), it would be necessary to employ a quite substantial excess of the diepoxide and to separate that product, as by preparative chromatography, from the rest of the reaction mixture, which would consist largely of unconverted epoxide and lower oligomers (see following formulas).)

When a more practicable excess of the diepoxide is employed, some of the adduct molecules may be of structure (2) but a high proportion of them will be oligomers having structures such as the following:

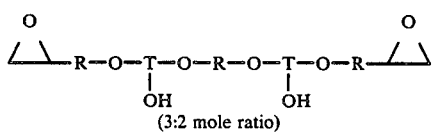  (3)

(3:2 mole ratio)

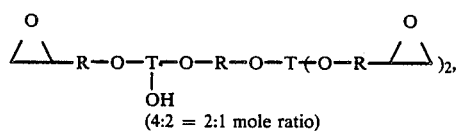  (4)

(4:2 = 2:1 mole ratio)

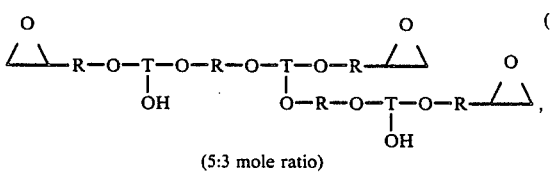  (5)

(5:3 mole ratio)

etc., wherein -O-R-O- represents a moiety

EXAMPLES

The following examples are for purposes of illustration and are not to be construed as limiting the scope of the present invention in a manner inconsistent with the claims in this patent.

Example 1

Advancement of DER*-331 with 23 phr of 1,1,1-tris(p-hydroxyphenyl)methane in the presence of ~0.5 phr of A-1** catalyst.

*Registered trademark of The Dow Chemical Company for Dow Epoxy Resins; DER-331 is a partially hydrolyzed, highly monomeric DGEBA having an EEW of about 180-192.
**Ethyl triphenyl phosphonium acetate.

0.5 Grams (0.5 phr) of A-1 catalyst (as 0.685 ml of a 70% solution in methanol) was added with stirring to a melt of 100 grams (0.27 g. moles) of DER-331 and 18 grams (0.06 g. moles; 18 phr) of the trisphenol, the melt having been formed, without stirring, by heating the DER-331 to 100° C., adding the trisphenol, heating to 120° C. and cooling back to 100° C. Heating was continued to onset of an exotherm at 120° C. and until a temperature of 145° C. was reached, and then stopped. The exotherm peaked at 160° C. and then the reaction mixture was allowed to cool slowly, then poured onto aluminum foil to solidify. The product had an EEW of 354. No HDT (Heat Distortion Temperature) determination was made.

Example 2

Advancements of DER-331 with successively higher phr of 1,1,1-tris(p-hydroxyphenyl)methane, using 0.05 phr of A-1 catalyst.

(a) 100 Grams (~0.54 equiv., 0.27 moles) of DER-331 was heated to 100° C. in a 100 ml pyrex beaker. Addition of 18 grams (18 phr; ~0.06 moles or 0.18 equiv.) of the trisphenol was commenced, with continued heating. To avoid sintering or gumming the reactants, stirring was delayed until a homogeneous, liquid solution formed—at a temperature of about 120° C. The solution, which was stirred thereafter, was cooled to about 90° C. and 0.05 grams (0.05 phr) A-1 catalyst was stirred in (as 0.069 ml of a 70% solution in methanol, diluted with 3 ml of methanol). Heating was discontinued at about 145° C. and a noticeable exotherm ensued at about 160°, raising the temperature to a peak of about 180°. The reaction mixture was allowed to cool slowly, then poured out on a metal plate to solidify (to a slightly soft resin mass).

The EEW of the resin was found to be 337 and the heat distortion temperature (HDT) of a test bar (formulated with 100 phr of nadic methyl anhydride and 1 phr of benzyl dimethyl amine and cured 2 hours at 90° C., 4 hours at 165° C. and 16 hours at 200° C.) was 177° C.

(b-d) Run a was essentially repeated but employing 21, 22 and 23 phr of the trisphenol, respectively. The corresponding exotherm ranges (onset to peak) were 150°-220°, 160°-190° and 160° to above 190° and the respective EEW and HDT values were 375/165°, 410/162° and 418/ND (ND=not determined).

It was judged, from observation of the foregoing runs a-d, that attempts to go to higher phr of the trisphenol would probably result in gelation of the hot reaction mass. This was confirmed in a run (e) in which 24 phr of the trisphenol was employed. Considerable foaming was observed during the exotherm (to a peak temperature in excess of 200° C.) and the reaction mixture became very viscous and distinctly rubber. The cooled product had an EEW of 578. No HDT test specimen was made.

It will be noted in comparing Examples 1 and 2a (both at 18 phr of the trisphenol) that the EEW of the advancement product decreased from 354 to 337 when the amount of catalyst was reduced from ~0.5 to ~0.05 phr.

Example 3

Advancement of DER-331 with 20 phr of 1,1,1-tris(p-hydroxyphenyl)methane, using 0.048 phr of A-1 catalyst with a forced exotherm, rapid post-exotherm cooling to 140° C. and holding at that temperature for 6 hours (to simulate holding for flaking) before determining melt viscosity and sampling for preparation of an HDT test bar.

A one-liter resin kettle equipped with a mechanical stirrer, gas inlet and outlet tubes, a thermometer and a thermo-controller probe, was charged with 500 grams (2.69 moles; 5.38 equiv.) of DER-331 (which is a liquid) and 100 grams (0.35 moles; 1.026 equiv.; 20 phr) of the trisphenol. The head-space in the kettle was swept with nitrogen and the mixture heated, without agitation, to 120° C.—at which point stirring was commenced. The mixture was stirred one hour at 120° C., then 343 mg of 70% A-1 catalyst in methanol (0.048 phr of A-1) was added and the stirring rate was increased. An exotherm started at 160° C. and sufficient extra heat was introduced to reach a peak temperature of 188° C.—at which point air-cooling of the kettle was used to bring the temperature down to 140° C. in a relatively brief time (estimated at about 20 minutes). The reaction mixture was then stirred slowly for 6 hours with sufficient heating to hold the temperature at 140° C., then poured onto aluminum foil and allowed to cool and solidify. The product had an EEW of 355 and a melt viscosity (RVA Brookfield) of 2100 cps at 140° C.

Example 4

Advancement of DER-331 or DER-383* with different triphenol source materials.

*DER-383 is an impure form of DGEBA containing a small amount of oligomers (i.e., having an "n value" of about 0.15) and having an EEW of about 180.

Three different triphenol source materials were utilized; (a) the tri(hydroxyphenyl)methane obtained from the acid catalyzed reaction of ortho-hydroxybenzaldehyde with phenol, (b) mixed triphenols derived from Reimer-Tieman waste bottoms, and (c) tris(p-hydroxyphenyl)methane.

A. Comparison between DGEBA/BA advanced resins and DER-331 advanced with triphenol material (c).

Table I, following, presents a comparison between three resins (DER-661, -663U and -664U; U meaning uncatalyzed) prepared by advancing DER-331 in the conventional manner with bisphenol A and four resins prepared by advancing DER-331, in the manner of Example 3 herein, with the mixed triphenols (c).

TABLE I

COMPARISON OF SOFTENING POINT AND VISCOSITY FOR BIS A AND TRIS PHENOL RESINS

| Resin | EEW | Polyphenol phr | Phenolic Hydroxyl phr | Softening Point | Viscosity[4] |
|---|---|---|---|---|---|
| (1) DER-661 | ~525 | 31.5 | 0.28 | 70-80° C.[1] | 1020 Cs |
| (2) DER-663U | ~750 | 39 | .34 | 90-100° | 2725 |
| (3) DER-664U | ~925 | 43 | .38 | 95-110° | 6300 |
| (4) Tris[3] | 347 | 18 | .18 | 69°[2] | 462 |
| (5) Tris[3] | 361 | 19 | .20 | 79° | 1057 |
| (6) Tris[3] | 369 | 20 | .21 | 81° | 1490 |

TABLE I-continued
COMPARISON OF SOFTENING POINT AND VISCOSITY FOR BIS A AND TRIS PHENOL RESINS

| Resin | EEW | Poly-phenol phr | Phenolic Hydroxyl phr | Softening Point | Viscosity[4] |
|---|---|---|---|---|---|
| (7) Tris[3] | 417 | 22 | .23 | 89° | 3651 |

[1]Durran's Softening Point.
[2]Mettler Dropping Point.
[3]R.T. Waste Bottoms Tris Phenol.
[4]Melt Viscosity at 150° C.

It is evident from the data in Table I that non-sintering products having considerably lower EEW's and viscosities were obtained at much lower polyphenol contents when the polyphenol was the triphenol mixture.

B. Table II, following, presents a comparison of resins made advancing an LER (liquid epoxy resin; DER-331 or -383) with successively higher amount of three different triphenol source materials (a, b, c). Except as noted, essentially the procedure of Example 3 was followed in preparing the product resins.

TABLE II
COMPARISON OF TRIPHENOL-LER ADVANCED RESINS

| Polyphenol/LER System | Property | phr TRIS | | | | | | | | | |
|---|---|---|---|---|---|---|---|---|---|---|---|
| | | 18 | 19 | 20 | 21 | 22 | 23 | 24 | 26 | 28 | 29 |
| R.T. Waste Bottoms Tri/ DER-331 | EEW | 347 | 361 | 369 | | 417 | | | | | |
| | VISC | 462 Cs[1] | 1057 | 1490 | | 3651 | | | | | |
| OHB Tri[3]/ DER-331 | EEW | 337 | 365 | | 396 | 410 | 418 | GEL[4] | | | |
| OHB Tri/ DER-383 | EEW | | 352 | | 365 | 388 | GEL[4] | | | | |
| | VISC | | 845 Cs[2] | | 2766 | 3584 | | | | | |
| ppp Tris/ DER-383[5] | EEW | 343 | | 354 | | | | | 462 | 515 | GEL[4] |
| | VISC | 225 Cs[2] | | 288 | | | | | 1958 | 9600 | |

[1]Melt viscosity at 150° C. after 1 hr at 180° C.
[2]Melt viscosity at 150° C. after return to 150° C.
[3]Adduction carried out essentially in manner of Example 3, using triphenol derived from o-hydroxybenzaldehyde.
[4]Reaction mixture gelled.
[5]Exotherm not forced in preparation of this resin.

It will be seen from Table II that the character of the advancement product was not much effected by the differences between DER-331 and -383 or by the differences between the triphenols derived from Reimer-Tieman waste bottoms and orthohydroxybenzaldehyde. However, the tris(p-hydroxyphenyl)methane—which was both oligomer-free and isomer-pure, gave consistently lower melt viscosities at similar EEW values. The latter trisphenol also could be incorporated in substantially greater amounts before gelling resulted.

C. Table III, following, presents the results of GPC (Gel Permeation Chromatographic) analysis of three of the series of products listed in Table II, using a Waters Associates No. 501 Instrument and a series of six columns packed with controlled porosity beads of a styrene/divinylbenzene copolymer (MicroStyragel; registered tradename of Waters Associates); the nominal pore sizes of the packings in the successive columns—in Angstroms—were 100, 100, 500, 10³, 10⁴ and 10⁵. The carrier/eluting solvent, tetrahydrofuran (THF), was introduced to the column train at a rate of 2 ml/minute. The computer normalized area percents of each of six discernible peaks in the GPC scans are given in the Table. Peaks 5 and 6 (the lowest molecular weight components, which emerge last from the columns) were assigned—by comparison to authentic samples of the individual materials—to the starting triphenols and LER's, respectively. The trisphenol (leucaurin) is actually lower in molecular weight than the LER's but apparently associates strongly with THF. It has a melting point well above 220° C. and complete dissolution of it is difficult to effect, even at (unforced) peak exotherm temperatures.

It will be seen that advancement mixtures prepared in the manner of Example 3 from diepoxide/triphenol mixtures comprising from about 18 to about 22 phr of the triphenol may have a zero content of unconverted triphenol and contain from about 31 to about 24 area % (GPC) of the unconverted diepoxide.

TABLE III

| Triphenol/LER System | Tri Phenol Level, phr | GPC PEAK AREA | | | | | |
|---|---|---|---|---|---|---|---|
| | | 1[1] | 2 | 3 | 4 | 5[2] | 6[3] |
| R.T. waste Tri/DER-331 | 18 | 14.5 | 31.4 | 17.8 | 5.5 | — | 30.8 |
| | 18.5 | 21.3 | 27.5 | 16.8 | 5.3 | — | 29.1 |
| | 19 | 19.8 | 29.1 | 17.3 | 5.3 | — | 28.5 |
| | 20 | 23.9 | 28.1 | 16.9 | 5.0 | — | 26.1 |
| | 22 | 26.9 | 28.8 | 15.1 | 4.3 | — | 24.9 |
| OHB Tri/ DER-383 | 19 | 18.2 | 35.7 | 13.6 | 5.7 | — | 26.8 |
| | 21 | 22.3 | 37.6 | 12.7 | 3.2 | — | 24.2 |
| | 22 | 21.4 | 37.2 | 13.0 | 4.4 | — | 24.0 |
| ppp Tris/ DER-383[4] | 19 | — | 43.2 | 21.0 | 4.7 | 6.5 | 24.6 |
| | 20 | 11.7 | 31.7 | 21.9 | 4.3 | 6.8 | 23.6 |
| | 26 | 17.1 | 40.3 | 16.2 | 3.8 | 7.3 | 15.3 |
| | 28 | 24.3 | 36.2 | 16.3 | 3.3 | 7.2 | 12.7 |

[1]Highest MW peak.
[2]Free tri phenol peak.
[3]Free LER peak (DER-331 or DER-383).
[4]Exotherm not forced in the preparation of this resin.

It will be apparent, from Table III, to those knowledgeable in the art, that the molecular weight spread in triphenol advanced LER's is considerably greater than in conventional, bisphenol advanced LER's. Both the level of unconverted LER and the contribution of higher molecular weight species are relatively larger in the advancement products of the present invention. It is particularly interesting to note the presence of substantial amounts of the unconverted tris phenol in the last four resins in the Table; this is attributed to not having forced the exotherm in preparing the subject resin. It may also be noted that the unconverted trisphenol could be utilized as at least part of the curing agent for the subject resin; it is a proven phenolic curing agent for epoxides.

D. Table IV, following, provides a comparison of HDT's for the four resins of the invention listed in Table II, with each other and with an HDT for a commercial "epoxidized" cresol novolac, ECN-1280 (registered tradename of Ciba-Geigy Co.).

TABLE IV

HEAT DISTORTION TEMPERATURE DATA FOR TRIS PHENOL-ADVANCED EPOXY RESINS

| Resin System | Tris Phenol Level, phr | Curing Agent HDT[1] | | | | |
|---|---|---|---|---|---|---|
| | | NMA[5] | MDA[6] | Tris Phenol[7] | 3.2 Novolac[8] | 438 Novolac[9] |
| OHB[2]/ | 18 | — | 161 | 157 | 137 | |
| DER-331 | 19 | 167 | 140 | 140 | 136 | |
| | 21 | 164 | 148 | 150 | 142 | |
| | 22 | 162 | 147 | — | 136 | |
| R.T. Waste | 16 | 133 | — | — | — | — |
| Triphenol/ | 19 | 112 | — | — | — | 150 |
| DER-331 | 22 | 141 | — | — | — | — |
| OHB[3]/ | 19 | 139 | — | — | — | — |
| DER-383 | 21 | 145 | — | — | — | — |
| | 22 | 142 | — | — | — | — |
| ppp Tris[4] | 20 | 125 | — | — | — | — |
| DER-383 | 26 | 122 | — | — | — | — |
| ECN-1280 | — | 189[5] | — | — | — | — |

[1]HDT for 1:1 cured system; determined with duPont 99 TA. Thermo-Mechanical Analyzer; which generally gives HDT's about 10° lower than the "classical" method.
[2]Material (a) above. Cure schedule 2 hrs/100° C., 18 hrs/180° C., 2 hrs/200° C.
[3]Material (b) above. Cure schedule 2 hrs/100° C., 18 hrs/180° C.
[4]Material (c) above. Cure schedule 2 hrs/100° C., 18 hrs/180° C.
[5]Typical value for ECN-1280 at 0.85 stoichiometry.
[6]Nadic Methyl Anhydride.
[7]Methylene Di Aniline.
[8]Tris(p-hydroxyphenyl)methane.
[9]A 3.2 functionality φOH/HCHO condensate.
[10]Dow Epoxy Novolac 438. ~4 functionality φOH/HCO condensate.

It will be seen from the data in the Table that the HDT's of the advancement products of the present invention fall between those (~100°–120° C.) typical of DGEBA/BA advancement products and those (160°+) typical of epoxidized condensation products of cresols and formaldehyde, such as ECN-1280. The somewhat lower HDT's for the trisphenol/DER-383 advancement product are believed due to not all of the tris phenol having been reacted into the resin; relatively higher HDT's would be expected with phenolic curing agents, rather than NMA.

Example 5

Blends of separately formed adduction products of LER's with bis- and triphenols, vis-a-vis co-adduction products of bis- and triphenols with the LER's.

Table V, following, is a compilation of property data for epoxies (I) of the present invention prepared by two different methods from DER-331, bisphenol A and tris(p-hydroxyphenyl)methane. The resins designated as A through E in the Table were made—essentially in the manner of Example 3—by co-adducting the bis- and trisphenols in several different proportions with DER-331. The resins designated as A', B' and C' were made by blending separately formed adducts of the bis- and trisphenols with DER-331.

TABLE V

COMPARISON OF LER COADDUCTS OF TRIS PHENOL AND BIS A WITH BLENDS OF LER'S SEPARATELY ADVANCED WITH THE TRIS- AND BISPHENOLS

Co-Adducts

| Designation | Wt. % DER-331 | Wt. % Bis A | Wt. % Tris | EEW | VISC[1] | DP[2] | HDT[3] |
|---|---|---|---|---|---|---|---|
| A | 75 | 15 | 10 | 454 | 555 Cs | 76.7° C. | 130° C. |
| B | 75 | 20 | 5 | 611 | 2605 | 93.8 | 111 |
| C | 80 | 10 | 10 | 440 | 490 | — | 124 |
| D[4] | 85 | 0 | 15 | 350 | 589 | 69.2 | 145 |
| E | 75 | 10 | 15 | | Gelled | | |

BLENDS

| Designation | Tris/331 Adv. Resin | Wt. % | Bis A/331 Adv. Resin | Wt. % | % EQ.[5] 331 | % EQ.[5] Bis A | % EQ.[5] Tris | VISC[1] | HDT[3] |
|---|---|---|---|---|---|---|---|---|---|
| A' | 22 phr | 50 | 664U | 50 | 76 | 15 | 9 | 4559 Cs | 112° C. |
| B' | 22 phr | 33 | 664U | 67 | 74 | 20 | 6 | 4918 | 106 |
| C' | 22 phr | 57 | 661 | 43 | 80 | 10 | 10 | 1906 | 121 |

[1]Viscosity at 150° C. in Cs on Brookfield RVT viscometer.
[2]Mettler dropping point.
[3]Heat distortion temperature by TMA on sample cured at 1:1 with nadic methyl anhydride on cure schedule 2 hrs/100° C., 18 hrs/180° C.
[4]Only nominally a "co"-adduct; included for comparison.
[5](Equivalent ratio of component to all components) × 100.

It will be seen from the Table that the co-adducts had substantially higher HDT's and considerably lower melt viscosities than comparable blends. Also, if allowance is made for the higher total phenolic hydroxyl content in run A vs. run c, the HDT's in both series increased as the trisphenol to bisphenol ratio went up.

Resin D (no bisphenol) had a high enough softening point to be non-sintering and was distinctly superior as to EEW, melt viscosity and HDT. It is evident that binary trisphenol/DER-331 advancement products comprising as little as 15 weight % (about 18 phr of the trisphenol have a highly desirable combination of EEW, melt viscosity, softening point and HDT values. Diepoxides having the compositions of DER-383 and DER-332 (essentially pure, monomeric DGEBA) are considered essentially equivalent to DER-331 for the preparation of such advancement products; see the data for the last resin (DER-383-derived) in Table II, for example.

The latter trisphenol, tris(p-hydroxyphenyl)methane is particularly advantageous as the triphenol in the epoxide compositions (I) of the invention by reason of conferring minimal viscosities and being usable in amounts of up to 28 phr without causing the adduction mass to gel.

As an example of advancement catalyst other than "A-1", BTMAC-benzyl, trimethyl ammonium chloride—may be mentioned. (This catalyst may be present in residual amounts in some LER's). It is less selective for phenolic hydroxyls over alcoholic hydroxyls than is desirable but may be used.

The utility of the epoxide compositions of the present invention is not limited to molding or casting resins. They may also be employed in powder coatings, in adhesives, laminates, resin-modified concretes, etc., as such or in admixture with conventionally employed materials such as reactive diluents and/or the full range of known additives for epoxies.

For all applications, the epoxide composition may be sintering or non-sintering but preferably is non-sintering.

What is claimed is:

1. An epoxide having an average oxirane functionality of about 2 or more and comprising at least 5 weight % of oligomeric molecules each of which is a reaction product of a diepoxide having an EEW of about 300 or less with a 1,1,1-tri(hydroxyphenyl)alkane or -alkene wherein the alkane or alkene moiety contains from 1 to 11 carbons, the mole ratio of said diepoxide to said triphenol, in each of said molecules, being—independently—within the range of from 2:2 to 3:1.

2. An epoxide according to claim 1 which is the reaction product of a liquid epoxy resin with from about 16 to about 28 phr of said triphenol in the presence of an advancement catalyst.

3. An epoxide according to claim 2 which is non-sintering and is the product of the reaction of said resin with from about 18 to about 28 phr of said triphenol.

4. An epoxide according to claim 3, said triphenol being a tris(p-hydroxyphenyl)alkane as defined in claim 1.

5. An epoxide according to claim 4, said trisphenol being tris(p-hydroxyphenyl)methane.

6. An epoxide according to claim 3, said triphenol being other than a tris(p-hydroxyphenyl)alkane or alkene and having been reacted with said resin in the amount of from about 18 to about 24 phr.

7. An epoxide of claim 1 consisting essentially of said oligomeric molecules.

8. An epoxide according to claim 2, said liquid epoxy consisting at least predominantly of molecules of the formula

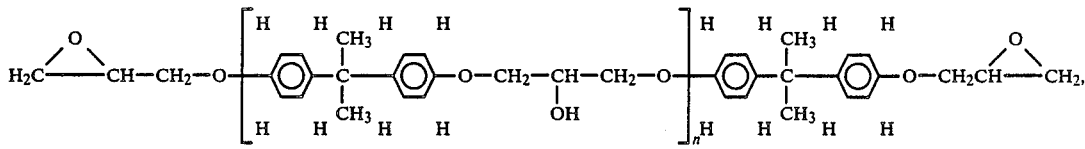

wherein n is within the range of from 0 to about 0.15 and optionally including a minor proportion of molecules derivable, by oxirane hydrolysis, from molecules of the latter formula.

9. An epoxide according to claim 8, the liquid epoxy being derived, by partial hydrolysis, from molecules of said formula having an average n value of about 0.15.

* * * * *